G. H. JANES, 3RD.
BORING TOOL.
APPLICATION FILED APR. 22, 1919.

1,354,830.

Patented Oct. 5, 1920.

Inventor:
George H. Janes 3rd.
by his atty.

UNITED STATES PATENT OFFICE.

GEORGE H. JANES, 3D, OF MEDFORD, MASSACHUSETTS.

BORING-TOOL.

1,354,830.   Specification of Letters Patent.   Patented Oct. 5, 1920.

Application filed April 22, 1919. Serial No. 291,968.

*To all whom it may concern:*

Be it known that I, GEORGE H. JANES, 3RD, a citizen of the United States, residing at Medford, in the county of Middlesex and State of Massachusetts, have invented new and useful Improvements in Boring-Tools, of which the following is a specification.

This invention relates to new and useful improvements in boring tools and particularly to tools for boring holes in plaster.

The object of the invention is to provide a device especially adapted to be used in connection with an ordinary bit brace by electricians for cutting holes in plaster walls and ceilings for the reception of electric outlet boxes.

Another object of the invention is to provide positioning means whereby the center of the hole may be located in the exact spot desired and a clean circular hole cut without breaking the edges of the plaster, the boring instrumentalities being guided about said center particularly during the early stages of the boring operation, said positioning means being adapted to either penetrate the plaster or to project into the interior of a pipe which may be protruding from the wall and around which it is desired to remove the plaster.

Another object of the invention is to provide means to engage the portion of the plaster which has been cut from the wall and which may be adhering to the laths and by further turning of the tool force said portion of plaster from said laths.

Still another object is to provide means whereby the dust falling during the boring operation may be collected and prevented from falling to the floor or into the eyes of the workman, especially on overhead work.

With these and other objects in view, my invention consists in the combination and arrangement of parts set forth in the following specification and particularly pointed out in the claims thereof.

Referring to the drawings.

Like numerals refer to like parts throughout the several views of the drawings.

Figure 1:
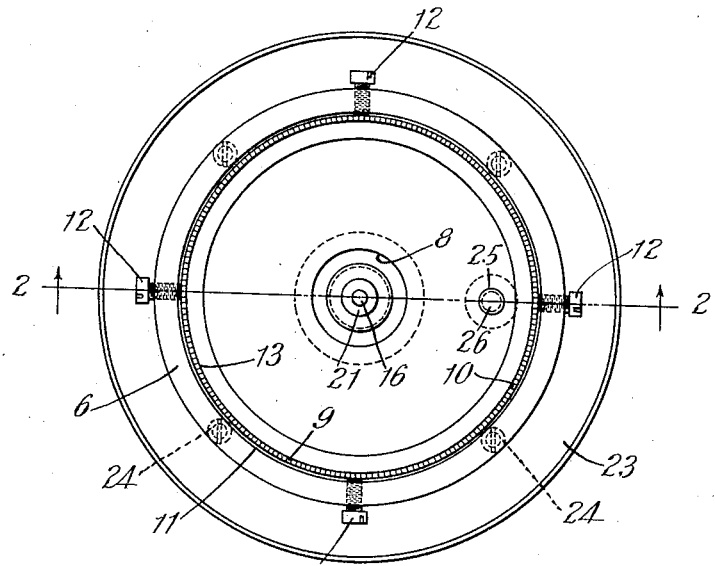
Figure 1 represents a plan view of my improved boring tool.

In the drawings, 5 represents a holder comprising a main body portion 6 and an extension 7, said extension 7 having a recess 8 on the interior thereof. A hack saw blade 9 having teeth 10 is bent and detachably mounted in a circular groove 11 formed in the body portion 6 of the holder 5. The hack saw blade thus bent constitutes a cylindrical boring member. Screws 12 engage the blade 9 and clamp said blade tightly against the wall 13 of the groove 11. A shank 14 extends through the extension 7 upon the median axial line of the cylindrical boring member 9 and terminates within the recess 8. A drill 16 is secured within the shank 14 by a screw 17 and is adapted to penetrate plaster 18 and laths 19 or any other material which may constitute a wall or ceiling and thereby center and position the boring tool during the boring operation.

Figure 2:
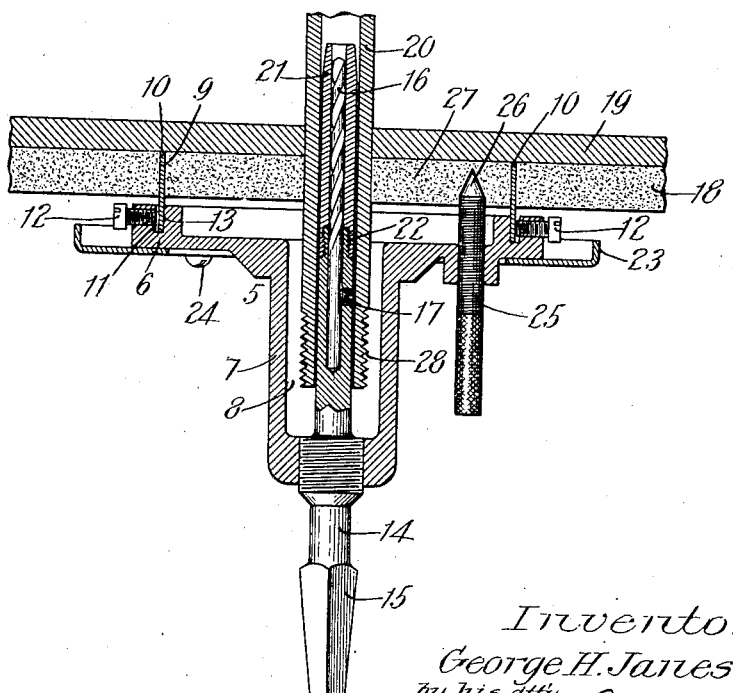
Fig. 2 is a transverse section taken on the line 2—2 of Fig. 1 showing in connection therewith a portion of a plastered wall together with a pipe projecting through said wall.

If there should happen to be a gas pipe 20 projecting through the wall as illustrated in Fig. 2, and it is desired to remove a portion of the plaster thereabout, a guard 21 is provided and is attached to the shank 14 at 22 thereby protecting the drill 16 and forming an extension to the shank 14. The guard 21 engages the interior of the pipe 20 and thereby centers and positions the boring tool during the boring operation. In order that the dust caused by the boring member cutting through the plaster may not be unnecessarily scattered, especially on overhead work, a receptacle 23 is provided and is secured to the holder 5 by screws 24. It is evident that if it is so desired the dust receptacle 23 may be made integral with the main portion 6 of the holder 5 without departing from the spirit of this invention.

It so happens that at times the operation of cutting through the plaster is not sufficient to remove the portion of the plaster 27 which has been cut from the main wall because the said plaster adheres to or projects between the laths 19.

To remove the plaster from the laths at such times a screw 25 is provided having a point 26 which is adapted to penetrate the plaster and upon the further turning of the boring tool the section of plaster 27 inclosed by the cylindrical boring member will be forced from the laths. The recess 8 within the interior of the extension 7 is of sufficient diameter to surround an ordinary pipe coupling which is sometimes attached to the screw threads 28 of the pipe 20 without having to remove said coupling from said pipe.

The operation of my improved boring tool is as follows: Assuming that it is desired to remove a section of plaster from a wall or ceiling for the reception of an electric outlet box or any other fixture, the position of said fixture having been determined, the drill 16 is placed against the wall and the boring tool is turned by means of the bit brace within which it is secured. The drill 16 upon penetrating the wall will constitute a centering member to position the boring tool which is particularly necessary during the early stages of the boring operation. The turning of the boring tool by the bit brace will cause the boring member to cut through the plaster 18 or other material constituting the wall until the boring member arrives at the laths 19. If the section 27 of plaster which has been thus cut from the main portion of the wall should adhere to the laths, the screw 25 is advanced until the point 26 penetrates the plaster 27 and upon the further application of force tending to turn the boring tool, said section 27 of plaster will be forced away from the laths 19 to which it adheres.

If there should happen to be a pipe 20 extending through the wall and it is desired to remove a portion of the plaster from around said pipe, the guard 21 is secured to the shank 14 and said guard engages the interior of said pipe and acts as the positioning member.

During the boring operation, and especially when the boring tool is used on overhead work, all loose dust will fall into the dust receptacle 23 around the outside of the boring member 9 or into the space formed within the cylindrical boring member and will not be scattered over the floor below or into the eyes of the workman.

Having thus specifically described my invention, what I claim and desire to secure by Letters Patent is:

1. A boring tool having, in combination, a holder; a boring member detachably mounted in said holder; a dust receptacle secured upon said holder; means constructed and arranged to penetrate a wall and thereby position said boring tool during the boring operation and means adapted to engage the material severed by said boring member and loosen said material from said wall.

2. A boring tool having, in combination, a holder, a circular groove in said holder, a cylindrical boring member detachably mounted in said groove, a dust receptacle secured to said holder, means constructed and arranged to penetrate a wall and thereby position said boring tool during the boring operation and a screw provided with a pointed end adapted to engage the material severed by said boring member and loosen said material from said wall.

In testimony whereof I have hereunto set my hand in presence of two subscribing witnesses.

GEORGE H. JANES, 3RD.

Witnesses:
FRANKLIN E. LOW,
CATHERINE M. JOYCE.